R. SALMON.
FLUID SHUT-OFF.
APPLICATION FILED MAR. 11, 1911.
1,026,884.
Patented May 21, 1912.
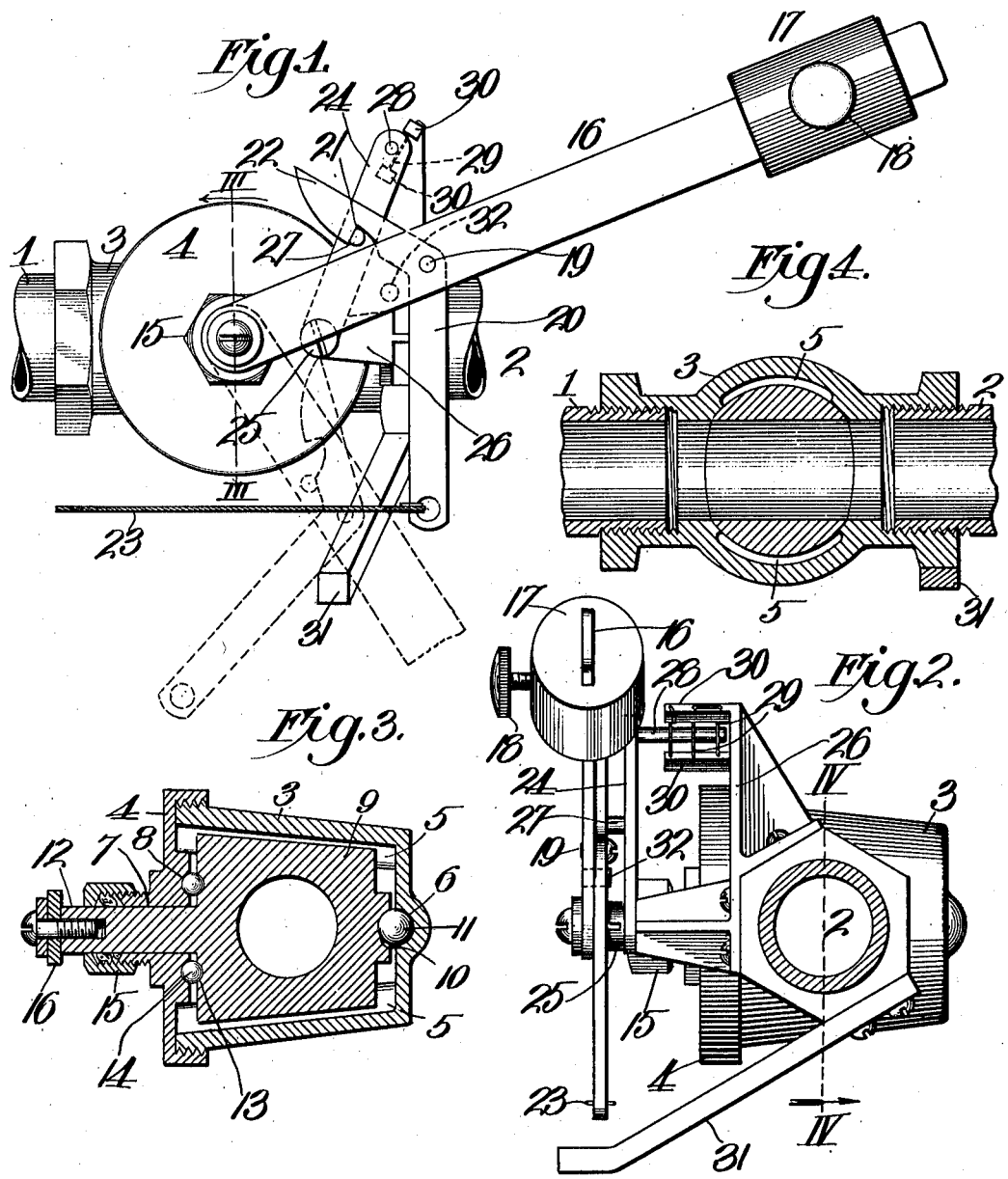
WITNESSES:
Frank R. Elov
H. C. Rodgers
INVENTOR.
Royal Salmon
BY George H. Thorpe ATTORNEY.

UNITED STATES PATENT OFFICE.

ROYAL SALMON, OF KANSAS CITY, MISSOURI.

FLUID SHUT-OFF.

1,026,884.  Specification of Letters Patent.  Patented May 21, 1912.

Application filed March 11, 1911. Serial No. 613,938.

*To all whom it may concern:*

Be it known that I, ROYAL SALMON, a citizen of the United States, residing at Kansas City, in the county of Jackson and State of Missouri, have invented certain new and useful Improvements in Fluid Shut-Offs, of which the following is a specification.

This invention relates to fluid shut-offs of that class designed to close automatically through the melting of a fuse or the tripping of a trigger by manual or other power, and my object is to produce a shut-off which can be closed by manual power in the event the fuse fails to melt or the valve of the apparatus fails to close after the fuse has melted.

A further object is to produce a valve which will operate with but little friction and a shut-off apparatus of simple, strong, compact and inexpensive construction.

With these objects in view the invention consists in certain novel and peculiar features of construction and organization as hereinafter described and claimed and in order that it may be fully understood reference is to be had to the accompanying drawing, in which:—

Figure 1, is a side view of a shut-off embodying my invention. Fig. 2, is an end view of the same. Fig. 3, is a vertical section on the line III—III of Fig. 1. Fig. 4, is a section on the line IV—IV of Fig. 2.

Referring now to the drawings, 1 and 2 indicate the gas supply and distributing pipes for a house or building, and said pipes are connected by a valve casing consisting of a body 3 and a removable head 4. The body is formed with a pair of recesses 5 and with a ball cavity or socket 6, and the head is formed with an opening 7 and a ball-race 8.

The valve is of the plug type as shown at 9, and is provided at one end with a cavity or socket 10, which with cavity 6, receives a ball or pivot 11. At the opposite end of the valve projects its stem in axial alinement with the said pivot, and extending concentrically around the stem is a ball-race 13, which with ball-race 8, receives the bearing balls 14, so that the valve shall have to overcome but little friction in turning, it being noticed in this connection that the provision of the recesses 5 reduces the frictional contact area between the valve plug and the casing. The stem of the valve plug projects through a stuffing box 15, and has secured to its outer end a lever 16, equipped with a slidable weight 17, provided with a set screw 18, the latter serving to secure the weight at the desired point of adjustment on the lever, it being understood that the function of the weighted lever is to insure the closure of the valve and the shutting off of the gas from pipe 2.

Pivoted at 19, to lever 16, is a trigger 20 provided with a shoulder 21, and a beveled free end 22, and connected to the opposite end of said trigger is a pull chain or connection 23, whereby the lever can be positively depressed manually, if necessary, it being understood that said connection may lead to any desired point where it will be accessible to a fireman or other person willing to assume responsibility for its operation.

For engagement with the shoulder of the trigger to hold the lever elevated and the valve open, a movable plate 24 is pivoted at 25 to a bracket 26 secured to the casing, said plate being provided with a pin 27 over which the beveled end of the trigger rides preliminary to the engagement of the pin by the shoulder of the trigger, and to support the plate in position to hold the lever elevated, the former is provided with a pin 28 to bear against the fusible support 29 extending between a pair of arms 30, projecting from the upper end of the bracket 26, the destruction of the fusible support from any cause leaving the weighted lever free to drop and close the valve, a stop-arm 31, projecting from the casing to limit downward movement of the said lever, and to facilitate and render more certain the depression of the lever under a pull applied through connection 23, said lever is provided with a pin 32 which arrests the pivotal movement of the trigger immediately its shoulder clears the pin 27 so that the continuation of said pull shall be exerted in a downward direction on the lever.

Assuming that a fire breaks out in a building equipped with my shut-off, anyone familiar with the shut-off or understanding its purpose can effect the closure of the valve by means of the pull connection irrespective of whether the fusible support is intact or not. If the fire gets hot enough to melt the fusible support before the valve is closed, the weight of the lever will effect the closure of the valve, the plate 24 through its engagement by the trigger, being compelled to swing to a pivotally-pendent position from pivot 25.

From the above description it will be seen that I have produced a fluid shut-off possessing the features of advantage enumerated as desirable, and which is susceptible of modification in certain particulars without departing from the principle of construction involved or the spirit of the appended claims.

I claim:—

1. A fluid shut-off, comprising a valve, a lever for closing the valve, a movable holder for normally holding the valve open, a fusible support for the holder, a connection between the lever and holder to compel the latter to move under the force of the former when the fusible support is broken, and means whereby the lever can be pulled down until the valve is closed when the fusible support remains intact.

2. A fluid shut-off, comprising a valve, a lever for closing the valve, a movable holder for normally holding the valve open, a fusible support for the holder, a connection between the lever and holder, and means to effect disengagement between the holder and the said connection to permit the lever to swing downward and close the valve when the fusible support remains intact.

3. A fluid shut-off, comprising a valve, a lever for closing the valve, a movable holder for normally holding the valve open, a fusible support for the holder, a connection between the lever and holder to compel the latter to move under the force of the former when the fusible support is broken, and means to trip the said connection from engagement with the holder when the fusible support remains intact.

4. A fluid-shut-off, comprising a valve, a lever for closing the valve, a movable holder for normally holding the valve open, a fusible support for the holder, a connection between the lever and holder to compel the latter to move under the force of the former when the fusible support is broken, and means susceptible of being pulled to trip the said connection from engagement with the holder and thus exert a positive downward pull on the lever until the valve is closed when the fusible support remains intact.

5. A fluid shut-off comprising a valve, a lever for closing the valve, a bracket suitably supported, a movable holder pivoted to the bracket for normally holding the valve open, a fusible support carried by the bracket and preventing pivotal movement of the holder, a trigger pivoted to the lever and engaging the said movable holder, and a pull connection to trip the trigger from engagement with the said holder when the fusible support remains intact.

6. A fluid-shut-off, comprising a valve, a lever for closing the valve, a bracket suitably supported, a movable holder pivoted to the bracket for normally holding the valve open, a fusible support carried by the bracket and preventing pivotal movement of the holder, a trigger pivoted to the lever and engaging said movable holder, a pull connection to trip the trigger from engagement with the said holder when the fusible support remains intact, and a pin projecting from the lever to arrest the pivotal movement of the trigger as the same is tripped from engagement with the holder.

7. A fluid shut-off comprising a casing, a rotary plug valve therein, a lever secured to and movable with the said valve, and tending to swing downward and close the valve, a bracket secured to the casing and provided with a fusible support, a pivoted holder for normally holding the valve open leaning against the fusible support and tending to swing downward, and a connection between the lever and the holder and tending to pull the latter in the same direction that the lever tends to swing when the fusible support remains intact.

8. A fluid shut-off, comprising a casing, a rotary plug valve therein, a lever secured to and movable with the said valve, and tending to swing downward and close the valve, a bracket secured to the casing and provided with a fusible support, a pivoted holder for normally holding the valve open leaning against the fusible support and tending to swing downward, a trigger pivoted to the lever and detachably engaging the holder and tending to pull the latter in the same direction that the lever tends to swing, and a pull connection attached to the trigger for hte purpose of tripping the same from engagement with the said holder when the fusible support remains intact.

In testimony whereof I affix my signature, in the presence of two witnesses.

ROYAL SALMON.

Witnesses:
HELEN C. RODGERS,
G. Y. THORPE.